(12) United States Patent
Macedo et al.

(10) Patent No.: US 10,929,839 B2
(45) Date of Patent: Feb. 23, 2021

(54) DIGITAL WALLET WITH INSTALLMENTS AND COMBO-CARD

(71) Applicant: MasterCard International Incorporated, Purchase, NY (US)

(72) Inventors: Marcel Fernando Macedo, Sao Paulo (BR); Marcelo Theodoro de Oliveira, Sao Paulo (BR); Nili Klenoff, Rye Brook, NY (US); Jason Moritz, Chesterfield, MO (US); Raphik Ouahsine, Miami Beach, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1046 days.

(21) Appl. No.: 14/986,248

(22) Filed: Dec. 31, 2015

(65) Prior Publication Data
US 2017/0193497 A1 Jul. 6, 2017

(51) Int. Cl.
| | |
|---|---|
| G06Q 40/00 | (2012.01) |
| G06Q 20/36 | (2012.01) |
| G06Q 20/22 | (2012.01) |
| G06Q 20/34 | (2012.01) |
| G06Q 20/24 | (2012.01) |
| G06Q 20/40 | (2012.01) |

(52) U.S. Cl.
CPC ......... *G06Q 20/36* (2013.01); *G06Q 20/227* (2013.01); *G06Q 20/24* (2013.01); *G06Q 20/3572* (2013.01); *G06Q 20/409* (2013.01)

(58) Field of Classification Search
CPC ...... G06Q 20/36; G06Q 20/227; G06Q 20/24; G06Q 20/3572; G06Q 20/409
See application file for complete search history.

(56) References Cited

U.S. PATENT DOCUMENTS

| | | | | |
|---|---|---|---|---|
| 6,064,987 A * | 5/2000 | Walker | ................ | G06Q 10/087 705/30 |
| 6,336,104 B1 * | 1/2002 | Walker | ................ | G06Q 10/087 705/26.1 |

(Continued)

FOREIGN PATENT DOCUMENTS

WO   2017006620 A1   7/2017

OTHER PUBLICATIONS

"PCT Notification of Transmittal of the International Search Report and Written Opinion", International Searching Authority, dated Mar. 3, 2017 (Mar. 3, 2017), for Application No. PCT/US2016/065054, 12pgs.

(Continued)

*Primary Examiner* — Rajesh Khattar
(74) *Attorney, Agent, or Firm* — Buckley, Maschoff & Talwalkar LLC (57) ABSTRACT

A wallet services system allows a user to access his/her digital wallet during a transaction with a merchant. The merchant transmits one or more parameters and transaction information to the wallet services system that are used by the wallet services system to identify one or more wallet options available to the user for the transaction. The wallet options may include selecting one or more installment payment options for the transaction or selecting a payment account type including a combo-card payment account type.

11 Claims, 6 Drawing Sheets

(56) References Cited

U.S. PATENT DOCUMENTS

| | | | |
|---|---|---|---|
| 6,980,968 B1* | 12/2005 | Walker | G06Q 20/04 705/26.1 |
| 7,475,044 B1* | 1/2009 | Kawai | G06Q 20/04 235/380 |
| 7,606,764 B1* | 10/2009 | Mancini | G06Q 20/10 705/17 |
| 9,799,027 B2* | 10/2017 | Pasa | G06Q 20/3674 |
| 2002/0026348 A1* | 2/2002 | Fowler | G06Q 30/02 705/14.11 |
| 2002/0083013 A1* | 6/2002 | Rollins | G06Q 20/02 705/76 |
| 2002/0191612 A1 | 7/2002 | Spodak et al. | |
| 2003/0028481 A1* | 2/2003 | Flitcroft | G06Q 20/00 705/39 |
| 2006/0085340 A1* | 4/2006 | Hung | G06Q 20/10 705/42 |
| 2007/0250442 A1* | 10/2007 | Hogan | G06Q 20/10 705/41 |
| 2008/0301041 A1* | 12/2008 | Bruk | G06Q 20/04 705/39 |
| 2010/0094735 A1* | 4/2010 | Reynolds | G06Q 20/102 705/34 |
| 2011/0202402 A1* | 8/2011 | Fowler | G06Q 30/02 705/14.25 |
| 2011/0238567 A1* | 9/2011 | Ferreira Da Silva | G06Q 20/10 705/39 |
| 2012/0124676 A1* | 5/2012 | Griffin | G06Q 20/12 726/28 |
| 2012/0166311 A1* | 6/2012 | Dwight | G06Q 30/0613 705/26.43 |
| 2012/0191612 A1 | 7/2012 | Spodak et al. | |
| 2012/0253852 A1* | 10/2012 | Pourfallah | G06Q 20/3276 705/4 |
| 2012/0310826 A1 | 12/2012 | Chatterjee | |
| 2013/0225239 A1* | 8/2013 | Wu | H04M 1/72519 455/558 |
| 2013/0254115 A1* | 9/2013 | Pasa | G06Q 20/20 705/67 |
| 2014/0279487 A1* | 9/2014 | Poole | G06Q 20/22 705/42 |
| 2015/0012425 A1 | 1/2015 | Mathew | |
| 2015/0127476 A1 | 5/2015 | Skiba et al. | |
| 2017/0243198 A1* | 8/2017 | Lee | G06Q 20/34 |
| 2018/0260833 A1* | 9/2018 | Khan | G06Q 20/322 |
| 2019/0340595 A1* | 11/2019 | Bhargava | G06Q 20/34 |

OTHER PUBLICATIONS

Chilean Office Action dated Jun. 11, 2019 which was issued in connection with Chilean Patent Application No. 201801723 which was filed on Jun. 12, 2016.

* cited by examiner

DIGITAL WALLET WITH INSTALLMENTS AND COMBO-CARD

BACKGROUND

Payment card accounts such as credit card accounts and debit card accounts are in widespread use. In one conventional manner of accessing a payment card account, the account holder presents a plastic card at the point of sale in a retail store. The point of sale device reads account information from the card (e.g., via a magnetic stripe or through wireless communication with an integrated circuit in the card, or via electrical contacts on the card) and initiates a payment card account transaction using the information read by the card.

Payment card accounts are also widely used in e-commerce. For example, an account holder may use a personal computer or a smartphone to access a merchant's online store webpage. After selecting goods for purchase and then opting for "check out," the account holder is prompted to enter his/her payment card account information into a data entry screen downloaded to his/her computer (or smartphone). The merchant's e-commerce host computer then initiates a payment card account transaction using the information that was entered by the account holder.

Given that many users of payment card accounts may have more than one such account, there have been proposals for so-called digital wallets. According to one type of proposed arrangement, a wallet service provider maintains "digital wallets" for a large number of users. Each user causes some or all of his/her payment card accounts to be enrolled in his/her digital wallet, and the wallet service provider stores the corresponding information in a data partition that is dedicated to the respective user and thus forms his/her "digital wallet." When the user seeks to check out at the conclusion of an e-commerce shopping transaction, the user is given the option to access his/her wallet at the digital service provider. Via data communication among the user's computer/smartphone, the merchant's e-commerce host computer and the wallet service provider's computer, the user is presented with an option to select one of his/her enrolled payment card accounts for use in the current e-commerce transaction. This may require only one or two "clicks" on the part of the user. Once the user selects the desired payment account from his/her digital wallet, the merchant is enabled to use the corresponding account information to initiate a payment card account transaction using the account selected by the user. This type of arrangement may offer great convenience to the user/online shopper, because he/she is freed from entering the payment card account information details as part of the e-commerce transaction. At the same time, the user has the option of selecting among various payment card accounts, and is not required to entrust his/her payment card account information for storage on the merchant's e-commerce computer.

The present inventors have now recognized an opportunity for a highly convenient way to implement and access the advantages of a digital wallet.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a wallet services system allows a user to access his/her digital wallet during a transaction with a merchant. The merchant transmits one or more parameters and transaction information to the wallet services system that are used by the wallet services system to identify one or more wallet options available to the user for the transaction. The wallet options may include selecting one or more installment payment options for the transaction or selecting a payment account type including a combo-card payment account type. Thus the user is able to use a single digital wallet to access several different payment card account types and, in some embodiments, to select one or more installment payment options during a transaction with a merchant. In some embodiments, systems and processes are provided to allow a user to register one or more payment cards in a digital wallet, including one or more cards designated to operate as a combo-card. As used herein, the term "combo-card" refers to a payment card having a single primary account number (or "PAN") that may be used as either or both of a credit card or a debit card.

Features of some embodiments of the present disclosure will now be described by reference to FIG. 1 which is a block diagram that illustrates a payment system 100 pursuant to some embodiments. As shown, the system 100 includes one or more client devices 102. Client device 102 may be or include a computing device, such as, for example, a laptop, desktop computer, a mobile device (such as a mobile telephone, a tablet, or the like) or the like. The client device 102 may be operated to interact with a merchant 104, such as, for example, over an Internet connection or the like. A user of the client device 102 may interact with a merchant website or merchant application to select one or more products or services to add to a shopping cart. When prompted with an option to checkout or complete the purchase, the user may select an option to checkout using a wallet pursuant to the present disclosure. The user may then be prompted to login to the user's wallet and select one or more payment options including, for example, the ability to select a payment card type from among credit, debit and combo-card. The wallet server will redirect the user to the merchant webpage to complete the transaction and, pursuant to some embodiments, may display one or more installment options to the user depending on the type of payment card selected as well as information associated with the merchant. Further details of these payment options that may be applied or determined during a transaction will be described further below in conjunction with the process of FIG. 4 and the user interface diagrams of FIGS. 5A-6B.

Figure 1:
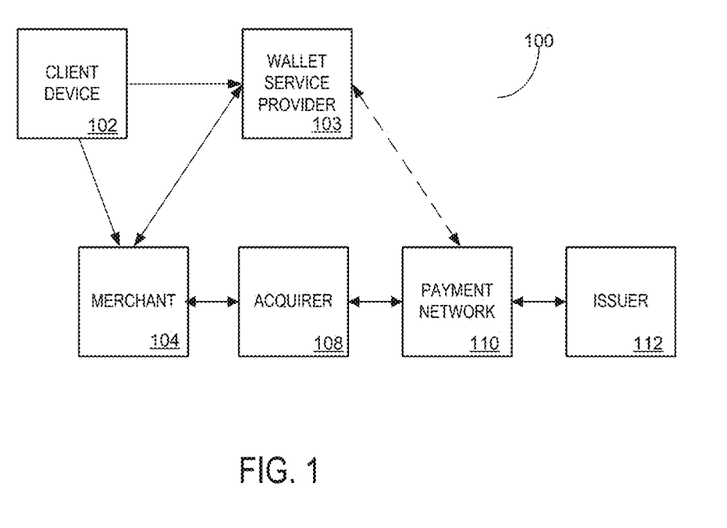
FIG. 1 is a block diagram that illustrates a payment system provided in accordance with some embodiments of the present disclosure.

A computer 108 operated by an acquirer (acquiring financial institution) is also shown as part of the system 100 in FIG. 1. The acquirer computer 108 may operate in a conventional manner to receive an authorization request for the transaction from the merchant 104. The acquirer computer 108 may route the authorization request via a payment network 110 to the server computer 112 operated by the issuer of a payment card account that is associated with a payment account selected for use in the transaction as described further herein. Pursuant to some embodiments, the authorization request includes information about one or more wallet or transaction options selected pursuant to the present disclosure (e.g., such as information specifying details of an installment plan selected by the user of the client device 102, and/or information specifying the details of how the payment account is to be used, such as, for example, as a credit, debit or combo-card).

The authorization response generated by the payment card issuer server computer 112 may be routed back to the merchant 104 via the payment network 110 and the acquirer computer 108. One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants. The system may also include a very large number of payment card account holders, who carry payment cards or other devices for initiating payment transactions and who have one or more of such payment devices registered in electronic wallets associated with wallet service provider 103.

Details of the wallet service provider 103 will be provided below in connection with FIG. 2 and other drawings. Again it is possible that a number of wallet service providers may be involved in a practical embodiment of the payment system 100. It should also be understood that many key functions of the wallet service provider 103 may be performed by one or more computers operated by it or on its behalf. Consequently, the block 103 will also be taken to represent at least one wallet service provider computer.

Figure 2:
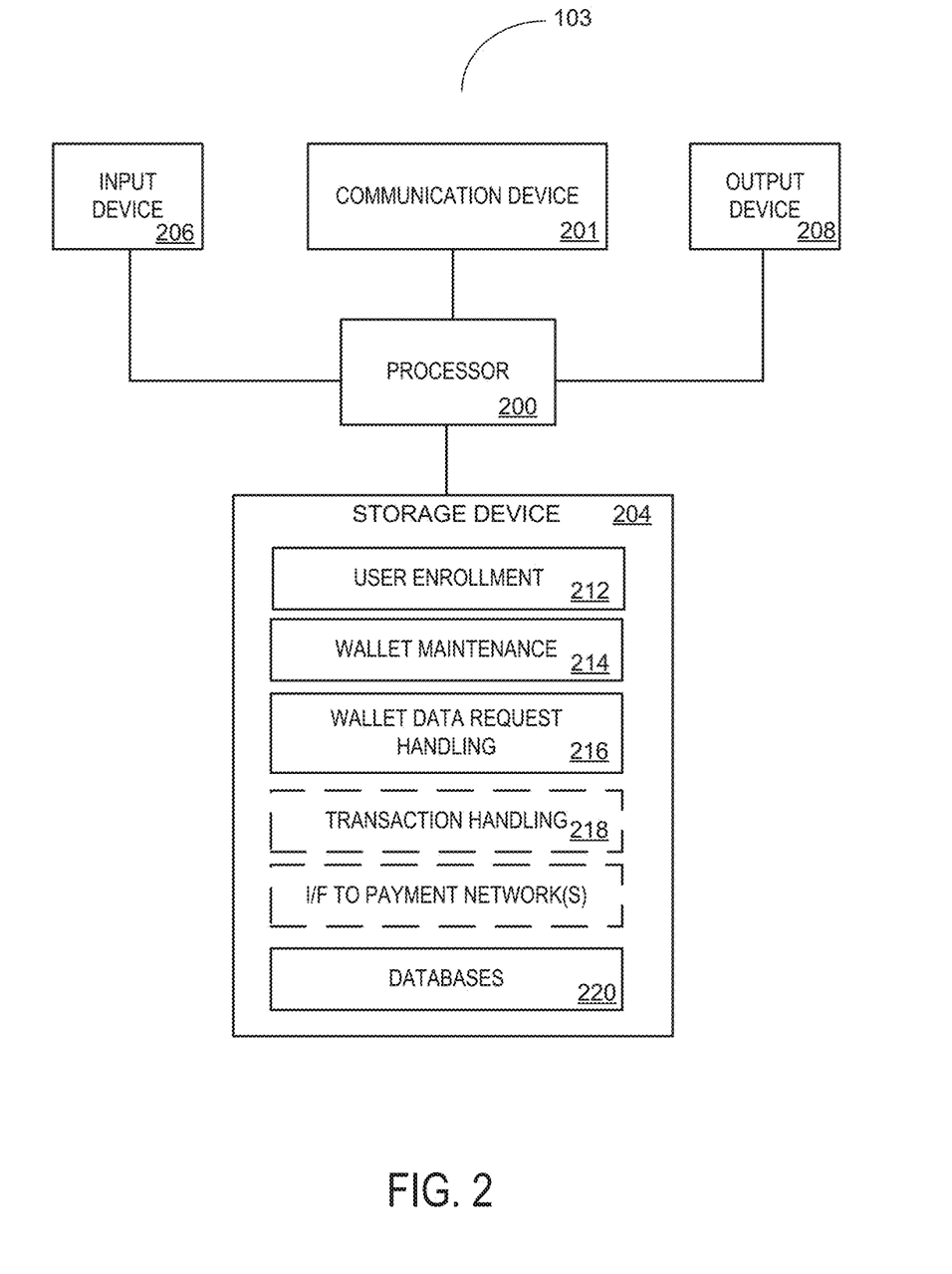
FIG. 2 is a block diagram that illustrates a computer system that may be operated by a wallet service provider as part of the system of FIG. 1 and in accordance with some embodiments of the present disclosure.

FIG. 2 is a block diagram that illustrates an example embodiment of the wallet service provider computer 103 as shown in FIG. 1 and provided in accordance with aspects of the present disclosure.

Referring now to FIG. 2, the wallet service provider computer 103 may be conventional in its hardware aspects but may be controlled by software to cause it to function as described herein. For example, the wallet service provider computer 103 may be constituted by conventional server computer hardware.

The wallet service provider computer 103 may include a computer processor 200 operatively coupled to a communication device 201, a storage device 204, an input device 206 and an output device 208.

The computer processor 200 may be constituted by one or more conventional processors. Processor 200 operates to execute processor-executable steps, contained in program instructions described below, so as to control the wallet service provider computer 103 to provide desired functionality.

Communication device 201 may be used to facilitate communication with, for example, other devices (such as the merchant 104, other merchants which are not shown, and other components of the payment system 100). Communication device 201 may comprise numerous communication ports (not separately shown), to allow the wallet service provider computer 103 to communicate simultaneously with a number of other computers and other devices, including communications as required to simultaneously handle numerous transactions.

Input device 206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 204 stores one or more programs for controlling processor 200. The programs comprise program instructions (which may be referred to as computer readable program code means) that contain processor-executable process steps of the wallet service provider computer 103, executed by the processor 200 to cause the wallet service provider computer 103 to function as described herein.

The programs may include one or more conventional operating systems (not shown) that control the processor 200 so as to manage and coordinate activities and sharing of resources in the wallet service provider computer 103, and to serve as a host for application programs (described below) that run on the wallet service provider computer 103.

The programs stored in the storage device 204 may also include a user enrollment application program 210 that controls the processor 200 to enable the wallet service provider computer 103 to handle requests from users to subscribe to digital wallet services provided by the wallet service provider computer 103. The user enrollment application program account may also operate to permit users to load (or register) their payment card accounts into their digital wallets maintained by the wallet service provider computer 103. For example, the user enrollment application program 210 may be used to perform a process such as that shown in FIG. 3 where a user registers one or more payment cards for use in a wallet, including one or more combo-cards.

The storage device 204 may also store a wallet maintenance application program 212 that controls the processor 200 to enable the wallet service provider computer 103 to store and maintain the digital wallets that have been established by users in the wallet service provider computer 103.

In addition, the storage device 204 may store an application program 214 for handling requests from merchants for wallet data, in a manner described below. Thus the request handling application program 214 may control the processor 200 such that the wallet service provider computer 103 provides functionality related to requests for wallet data as described herein.

In some embodiments, the storage device 204 may store a payment transaction handling program 216, which controls the processor 200 to enable the wallet service provider computer 103 to serve the role of acquirer for payment card account transactions with respect to the payment network 110.

Continuing to refer to FIG. 2, and in some embodiments of the wallet service provider computer 103, the storage device 204 may also store a payment network interface program 218, which provides a data communications interface to the payment network 110—and possibly to other payment networks as well—to allow for submission of authorization requests by the wallet service provider computer 103 and receipt of authorization responses. Further, the payment network interface program 218 may be used to validate payment accounts that are loaded or enrolled in a wallet.

The storage device 204 may also store, and the wallet service provider computer 103 may also execute, other programs, which are not shown. For example, such programs may include a reporting application, which may respond to requests from system administrators for reports on the activities performed by the wallet service provider computer 103. The other programs may also include, e.g., one or more data communication programs, a database management program, device drivers, etc. In some embodiments, programs or data may also be provided for use in determining or presenting information associated with one or more installment payments during a transaction. For example, in some embodiments, certain merchants, payment cards, and transactions may be determined to be eligible for installment payments rather than a single transaction amount. The wallet service provider, in conjunction with information from the merchant, may generate information for display to the user breaking the single transaction amount into one or more installment payment plans with a corresponding installment amount.

The storage device 204 may also store one or more databases 220 required for operation of the wallet service provider computer 103. Such databases may include, for example, a database (not separately indicated in FIG. 4) for storing data corresponding to digital wallets maintained for users/cardholders in the wallet service provider computer 103.

In some embodiments of the system 100, individuals who have a number of payment card accounts, perhaps from varying issuers, may enroll with the wallet service provider to set up digital wallets for themselves to be maintained by the wallet service provider. For example, they may do so by interacting with a webpage that is hosted by the wallet service provider computer 103. Once an individual user has established a user account via the webpage, he/she may request the wallet service provider computer 103 to establish his/her digital wallet, which may take the form of a data partition in a database 220 stored in the wallet service provider computer 103. The user may also take advantage of software tools provided through the wallet service provider computer 103 to add one or more of the user's payment card accounts to his/her digital wallet. In some embodiments, this may be done by authorizing the wallet service provider computer 103 to contact the issuers of the payment card accounts to initiate a process of loading the relevant account data into the user's digital wallet. In some embodiments, as part of this process, the issuers may contact the user to confirm that the request from the wallet service provider computer 103 is indeed authorized by the user. In other embodiments, the user may individually send requests to his/her payment card account issuers that they transfer the payment account data to the wallet service provider computer 103 for inclusion in the user's digital wallet.

In addition to including payment card accounts such as credit card accounts, debit card accounts and combo-card accounts to their digital wallets, the users may include other types of accounts as well, such as gift card accounts, loyalty rewards accounts, benefit disbursement accounts, transit access accounts, etc. The accounts may all be branded from one payment network, or there may be accounts branded from more than one payment network in the user's digital wallet.

Figure 3:
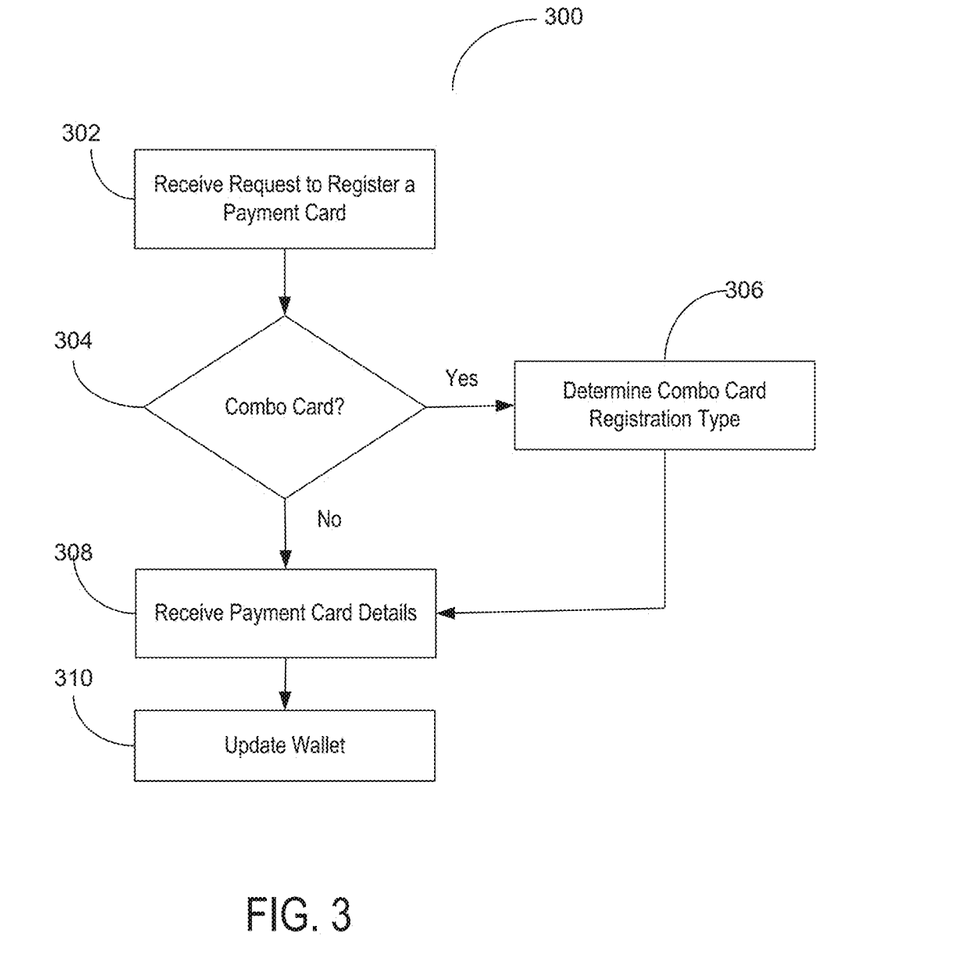
FIG. 3 is a flow chart that illustrates a registration process that may be performed by the wallet service provider of FIG. 2 in accordance with some embodiments of the present disclosure.

FIG. 3 is a flow chart that illustrates a registration process that may be performed by the wallet service provider 103 in accordance with aspects of the present disclosure. Processing of FIG. 3 begins at 302 where the wallet service provider receives a request to register a payment card from a user. For example, the request may be received from a client device operated by a user (such as a mobile device, a computer, or the like). Processing continues at 304 where the wallet services provider determines whether the payment card to be registered is a combo-card. In some embodiments, the determination is based on information provided by the user (e.g., such as a PAN, a portion of a PAN, or other information provided by the user). If the card to be registered is a combo-card, processing continues at 306 where the wallet service provider determines how the combo-card is to be registered (e.g., by inquiring of, or otherwise presenting prompting questions to the user). For example, a combo-card may be registered as a credit or a debit card (or both). That is, the user may specify whether the combo-card is to be enabled in the digital wallet to act as a credit card, as a debit card, or if it is to have the functionality of both types of cards. The determination of the card function will determine how the combo-card is displayed and used in the wallet as will be described further below.

Processing continues at 308 (including when the card to be registered is not a combo-card) where payment card details are received from the user. For example, the user may be prompted to provide further information to complete the association of a payment card to a wallet (such as a PAN, expiry date, verification codes, or the like). In some embodiments, the user may also be prompted for a billing address and one or more shipping addresses to be associated with the payment card.

Processing continues at 310 where the digital wallet is updated. At this point, the user may use the digital wallet to conduct purchase transactions at merchants supporting the wallet system.

Figure 4:
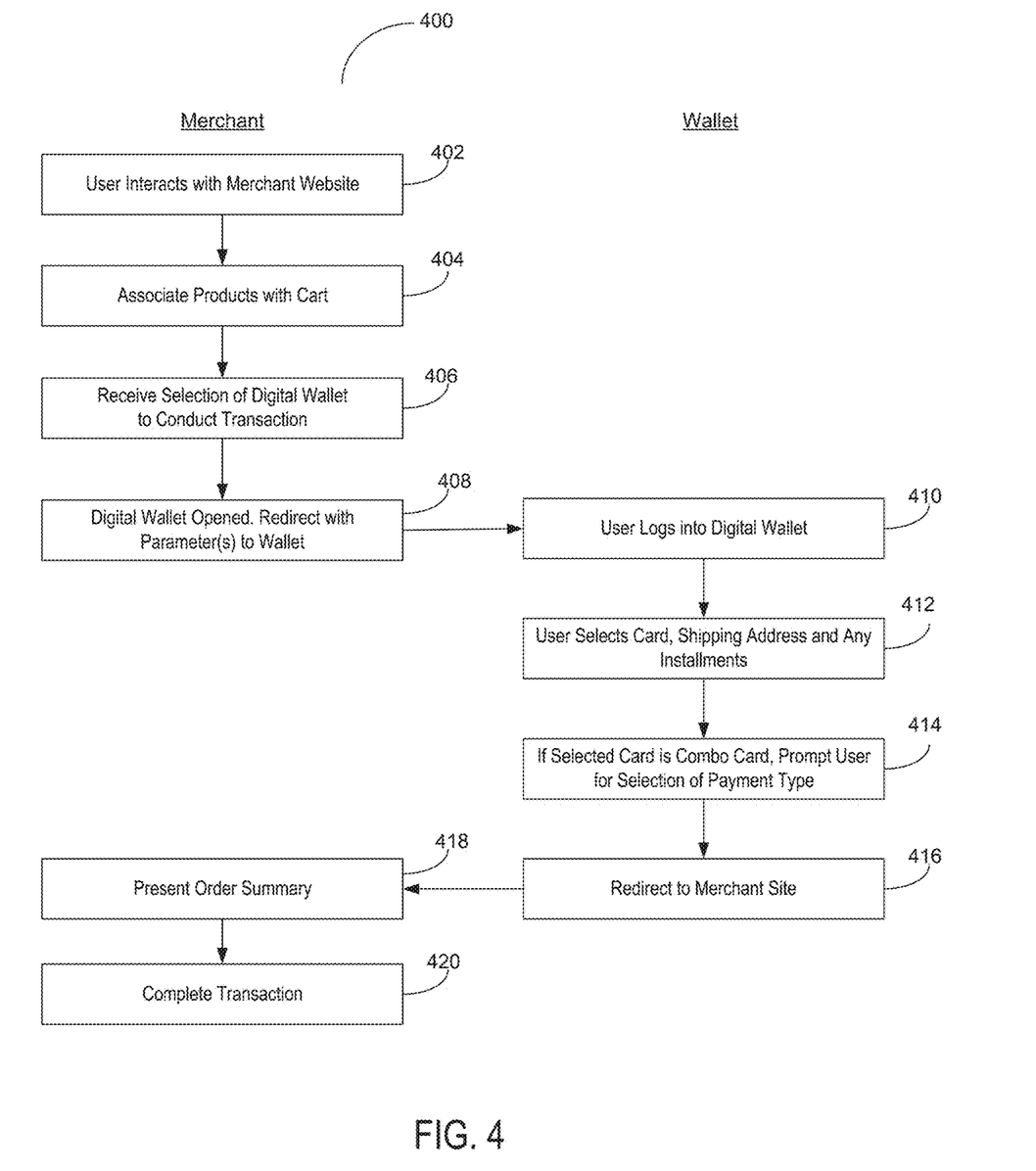
FIG. 4 is a flow chart that illustrates a transaction process that may be performed by the wallet service provider of FIG. 2 in accordance with some embodiments of the present disclosure.

Reference is now made to FIG. 4, where a method 400 is shown for conducting a transaction using a digital wallet. As shown, portions of the process may be performed or controlled by the merchant systems while portions may be performed or controlled by the wallet service provider 103. The portions performed by each system are shown for illustration; in some embodiments, other processing arrangements may be provided.

Processing begins at 402 where a user interacts with a merchant website or web application (e.g., to browse for goods or services to purchase from the merchant). Processing continues at 404 where the user indicates or selects one or more goods or services to purchase from the merchant (e.g., by putting the item(s) in a shopping cart). Processing continues at 406 where the user indicates to the merchant that they wish to checkout or complete the purchase using a digital wallet pursuant to the present disclosure (e.g., by selecting or clicking on a digital wallet icon or button in a shopping cart). The selection of the digital wallet option causes the digital wallet to be opened (e.g., in an iframe or the like) and the user's browser (or a portion thereof) is redirected to a website hosted by or on behalf of the wallet service provider. The redirect at 408 includes one or more parameters and information about the transaction. For example, in some embodiments, the parameters may include information identifying a transaction amount, the goods to be purchased, and information identifying the merchant. Further, in some embodiments, information identifying whether the merchant supports installment payments may be provided.

Processing continues at 410 where the digital wallet provider prompts the user to log into their digital wallet. Processing continues at 412 where the user, logged into their digital wallet, selects a payment card for use in completing the transaction, a shipping address for delivery of the products, and whether an installment option (if one is provided) is desired. Pursuant to some embodiments, not all merchants or payment account issuers may support the user of installment payments. The wallet service provider, at 412, uses information from the merchant and transaction to determine whether an installment payment option is to be presented to the user, and if one is available, the amounts and types of installment options to be presented.

Processing continues at 414 where a determination is made whether the selected payment card is a combo card. If so, and if the user (in the registration process of FIG. 3) indicated that the combo card was to be treated as both a credit card and a debit card, the user is prompted to select whether to use the combo card as a debit card or a credit card for the current transaction. In some embodiments, if the user selects to use the combo card as a debit card, any installment options may be removed. In some embodiments, the determination of whether installment payment options are to be provided is made after the user determines whether the combo card is to be used as a credit or a debit card.

Processing continues at 416 where the user is redirected to the merchant site. As part of the redirect, information from the wallet service provider is transmitted to the merchant. For example, an identifier identifying the selected payment card may be provided to the merchant as well as information about the shipping address(es) to be used in the transaction. Further, information identifying the installment plan and amounts may be provided.

Processing continues at 418 where the merchant causes an order summary to be presented to the user (e.g., allowing the user to verify information such as the shipping address(es), the installment plan options, and the like). The transaction is completed at 420.

Figure 5A:
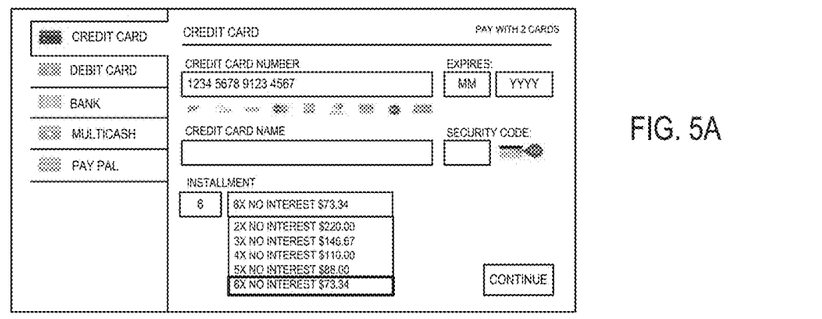
FIGS. 5A-5B show example screen displays that may be presented on a display screen of a client device in accordance with some embodiments.
Figure 5B:
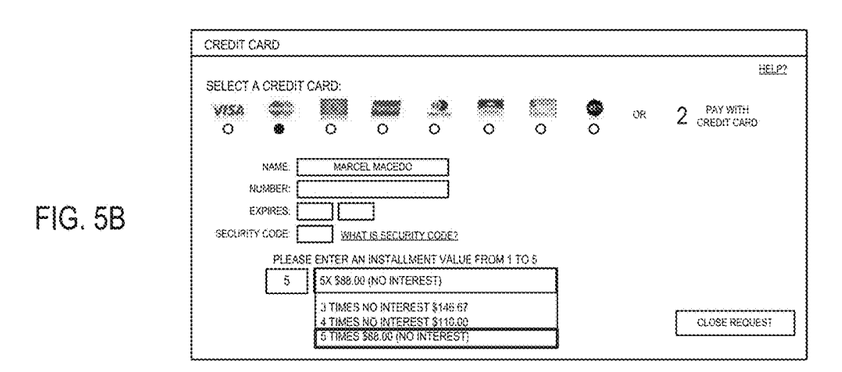

Reference is now made to FIGS. 5A and 5B where portions of a user interface are shown which may be presented to a user of a digital wallet on a display screen of a client device operated by the user. In some embodiments of the present disclosure, installment payment options may be presented to users even in situations where the user has not previously established a digital wallet account with wallet service provider 103. For example, during a checkout transaction, the user may be prompted to enter information about a payment account for use in the transaction, and the wallet service provider 103 (or an entity or device having similar functionality as the wallet service provider 103) may determine whether installment options are available for use with that payment account in that transaction with the merchant. In FIG. 5A, a portion of a user interface is shown depicting screens that may be shown to a user during such a checkout transaction. As shown, the user is prompted to provide information about a payment account. If the payment account and the transaction at that merchant are eligible for one or more installment options, they are presented to the user in the user interface. The user selects a desired payment option and continues the checkout. A similar user interface is shown in FIG. 5B. In this way, users enjoy the ability to use installment payment options at digital merchant locations even if a digital wallet account has not previously been established.

Figure 6A:
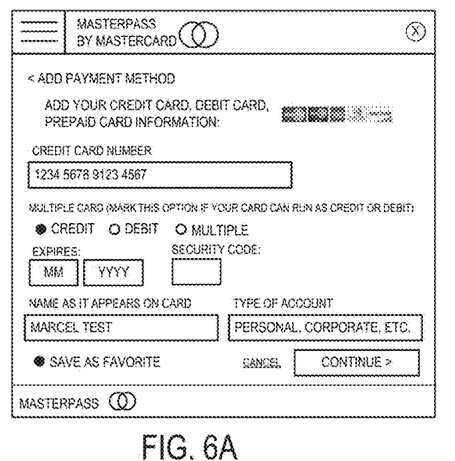
FIGS. 6A-6B show example screen displays that may be presented on a display screen of a client device in accordance with some embodiments.
Figure 6B:
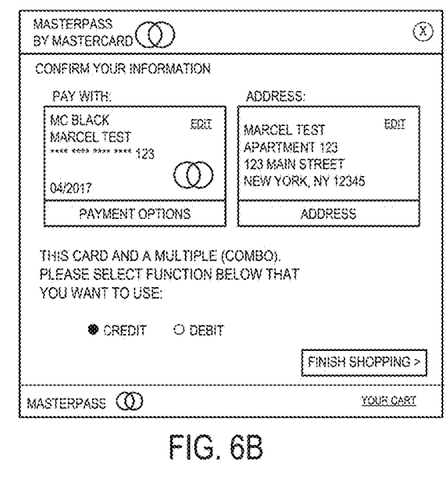

Reference is now made to FIGS. 6A and 6B where portions of a user interface are shown which may be presented to a user of a digital wallet on a display screen of a client device operated by the user. In some embodiments of the present disclosure, the option to use a combo-card may be presented to users even in situations where the user has not previously established a digital wallet account with wallet service provider 103. For example, during a checkout transaction, the user may be prompted to enter information about a payment account for use in the transaction, and the wallet service provider 103 (or an entity or device having similar functionality as the wallet service provider 103) may determine whether the payment account is a combo card. If the card is a combo card, a user interface such as that shown in FIG. 6B may be presented to the user allowing the user to indicate whether the combo card is to be used as a credit card or a combo card. Further, one or more addresses may be provided by the user for use in conjunction with the payment card.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, combo card (which may have either debit or credit functionality) prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
    receiving at a wallet services provider computer, a redirect request from a transaction involving a user and a merchant, the redirect request including information to cause at least a portion of a browser of a user device to redirect from an interaction between the user and the merchant to an interaction between the user and the wallet services provider computer and to provide one or more parameters associated with the transaction to the wallet services provider computer;
    receiving from the user over the at least portion of the browser of the user device, a selection of a payment card for use in the transaction;
    determining that a payment card type of the selected payment card is a combo-card type where the combo-card type payment card has a single primary account number that may be used as either or both of a credit card or a debit card in a transaction;
    presenting the user with a choice to specify how the combo-card type payment card is to be used in the transaction, the choice including (i) use the combo-card as a debit card and (ii) use the combo-card as a credit card;
    receiving, during the transaction, and over the at least portion of the browser of the user device the selected choice to use the selected payment card in the transaction as a credit card;
    identifying, based at least in part on the one or more parameters and the user selection, a set of installment payment options for the transaction;
    receiving, during the transaction, a selection of one of the installment payment options from the user; and
    redirecting the at least portion of the browser of the user device from an interaction between the user and the wallet services provider computer to an interaction between the user and the merchant, allowing the user to complete the transaction using the selected payment card as a credit card and using one of the installment payment options based on the selected choice received from the user.

2. The method of claim 1, further comprising:
    determining that the user selected to use the payment card as a credit card; and
    determining, based on at least one or more parameters associated with the transaction, that the transaction and the merchant support installment payments.

3. The method of claim 2, further comprising:
    identifying a set of installment payment options for the transaction and presenting the installment payment options to the user.

4. The method of claim 3, further comprising:
    receiving a selection of one of the installment payment options from the user, wherein the redirecting the user to the merchant further comprises transmitting the selection of the one of the installment payment options to the merchant for use in completing the transaction.

5. The method of claim 1, wherein the one or more parameters associated with the transaction includes a flag for indicating that the transaction is eligible for an installment payment option.

6. The method of claim 1, further comprising:
    prompting the user to sign into a digital wallet.

7. The method of claim 6, further comprising:
    displaying, to the user after signing into the digital wallet, information identifying at least a first registered payment card.

8. The method of claim 7, wherein the displayed information includes account nicknames assigned to the at least first registered payment card by the user.

9. The method of claim 1, further comprising:
    transmitting an authorization request from the merchant to a transaction acquirer, the authorization request including an indicator number that represents the selected payment card.

10. A non-transitory, computer-readable medium storing instructions, that, when executed by a processor, cause the processor to perform a method comprising:
    receiving at a wallet services provider computer, a redirect request from a transaction involving a user and a merchant, the redirect request including information to cause at least a portion of a browser of a user device to redirect from an interaction between the user and the merchant to an interaction between the user and the wallet services provider computer and to provide one or more parameters associated with the transaction to the wallet services provider computer;
    receiving from the user over the at least portion of the browser of the user device, a selection of a payment card for use in the transaction;
    determining that a payment card type of the selected payment card is a combo-card type type where the combo-card type payment card has a single primary account number that may be used as either or both of a credit card or a debit card in a transaction;
    presenting the user with a choice to specify how the user chooses to use the selected payment card in the transaction, the choice including (i) use the combo-card as a debit card and (ii) use the combo-card as a credit card;
    receiving over the at least portion of the browser of the user device a selected choice to use the selected payment card as a credit card in the transaction;
    identifying, based at least in part on the one or more parameters and the user selection, a set of installment payment options for the transaction;

receiving, during the transaction, a selection of one of the installment payment options from the user; and redirecting the at least portion of the browser of the user device from an interaction between the user and the wallet services provider computer to an interaction between the user and the merchant, allowing the user to complete the transaction using the selected payment card as a credit card and using one of the installment payment options based on the selected choice received from the user.

11. A method comprising:

receiving at a wallet services provider computer, a redirect request from a transaction involving a user and a merchant, the redirect request including information to cause at least a portion of a browser of a user device to redirect from an interaction between the user and the merchant to an interaction between the user and the wallet services provider computer and to provide one or more parameters associated with the transaction to the wallet services provider computer;

receiving from the user over the at least portion of the browser of the user device, a selection of a payment card for use in the transaction;

determining that a payment card type of the selected payment card is a combo-card type type where the combo-card type payment card has a single primary account number that may be used as either or both of a credit card or a debit card in a transaction;

receiving, from the user, a selection to use the combo-card type payment card in the transaction as a credit card;

identifying, based at least in part on the one or more parameters and the user selection to use the combo-card type payment card in the transaction as a credit card, a set of installment payment options for the transaction;

presenting the user with information associated with the set of installment payment options for the transaction;

receiving, during the transaction, and over the least portion of the browser of the user device, a selection of one of the installment payment options from the user; and redirecting the at least portion of the browser of the user device from an interaction between the user and the wallet services provider computer to an interaction between the user and the merchant and, as part of the redirecting, transmitting the selection of the one or more installment payment options to the merchant for use in completing the transaction.

* * * * *